Aug. 22, 1967 J. N. JOHNSEN ET AL 3,336,783
DEVICE FOR MANUFACTURING A PRE-IMPREGNATED
OIL-FILLED CABLE HAVING A METAL SHEATH
Filed Aug. 27, 1964 3 Sheets-Sheet 1

Inventors
JOHN N. JOHNSEN, KAARE MARSTEIN,
HALVOR TESLO & THOR AAMODT
By
Percy P. Lantz
Attorney

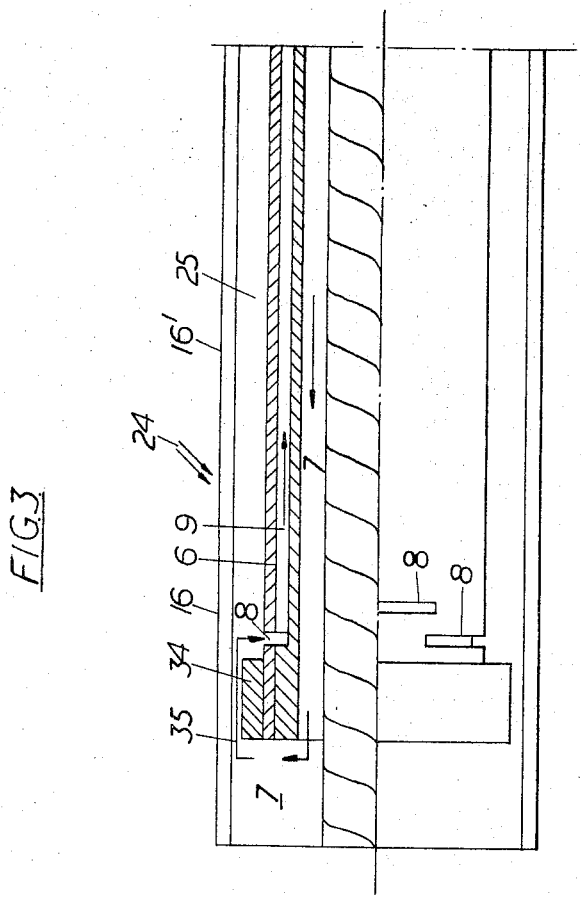

United States Patent Office 3,336,783
Patented Aug. 22, 1967

3,336,783
DEVICE FOR MANUFACTURING A PRE-IMPREGNATED OIL-FILLED CABLE HAVING A METAL SHEATH
John Normann Johnsen and Kaare Marstein, Oslo, Halvor Teslo, Bryn, and Thor Aamodt, Oslo, Norway, assignors to International Standard Electric Corporation, New York, N.Y., a corporation of Delaware
Filed Aug. 27, 1964, Ser. No. 392,475
Claims priority, application Norway, Nov. 15, 1963, 150,835
10 Claims. (Cl. 72—268)

The present invention relates to the extrusion of a metal sheath, in particular an aluminium sheath, onto cables of the oil-filled type which are impregnated with a thin oil before the sheath is applied. It is assumed that the inner diameter of the sheath, during the extrusion, has a larger diameter than the impregnated cable, as the sheath after the extrusion is to be corrugated or drawn through a shrinking die to a diameter corresponding to the impregnated cable. This drawing or corrugation may be performed in a manner known per se in a separate operation after the sheath is applied, or it may be done in the same operation.

It is known that oil-filled cables which are impregnated with thin oil before the sheathing process, i.e. according to the so-called mass-impregnating process, should be guided within a closed oil filled tube from the impregnating vessel to the extruder, as the thin oil otherwise partly would leak out of the insulation and partly would be substituted by air or gas which may be detrimental for the insulation. The temperature of the extruding tool may, however, in order to allow extrusion of the metal sheath, be so high that it is detrimental for the thin oil used. When the sheath is made of lead, there is usually no danger of destroying the characteristics of the oil. If the sheath, however, is made of a metal which requires a higher sheathing temperature, e.g. of aluminium, the oil will be decomposed if it comes in touch with the extruding die or the hot metal sheath. As an example it may be mentioned that for an aluminium extruder, the die and the sheath leaving the extruder have a temperature of about 500° C., and this temperature is too high for the thin oil used.

In order to avoid the cable and/or the oil being subjected to such high temperatures, it has been suggested to introduce a tube into the extruder, said tube encompassing the cable and being so long that it shields against the hot parts of the extruder and the metal sheath. This tube is at one end attached to the tube which connects the extruder with the impregnating vessel and at the other end provided with a gasket, the object of which is to make a tight connection between the shielding tube and the metal sheath, at the place where the sheath is cooled down to an acceptable temperature. This arrangement has the disadvantage that the friction between the gasket and the sheath, due to the gasket pressure, may be so large that the sheath upon leaving the extruder where the temperature is the highest and where the mechanical rigidity of the sheath, therefore, is very low, will have a tendency to be deformed. Such a deformation is in itself detrimental and as a consequence the effectiveness of the gasket is reduced in practice. It requires, in addition, a large degree of accuracy as to the design and centering of the tube, so that the gasket pressure against the sheath is just th same around the whole surface, and this may be very difficult to attain in practice.

The object of the present invention is to provide a solution to this problem whereby the said difficulties are overcome. According to the invention a double walled tube is inserted into the extruding tool. The inner wall of the tube is vacuum tight and connected directly or indirectly to the tube which connects the impregnating vessel with the extruder and is a continuation of this tube. The outer wall of the double walled tube, which must be inserted so far into the extruder that the end is well out of the hot zone of the aluminium sheath which is produced, is provided with holes in the end of the tube. The intermediate space between the walls in the double walled tube is connected by means of a vacuum tight tube to an oil reservoir or a degassing device, e.g., by means of an oil pump, a cooler and a filter. At suitable oil pressure in the impregnating vessel, the oil is forced to flow along the cable through the holes in the double walled tube and into the intermediate space in the double walled tube. The opposite flow of oil thereby provided partly protects the cable against excessive temperature and partly brings with it some of the oil which may have been subjected to the excessive temperature, so that this oil is prevented from entering the cable. This oil which is flowing in the opposite direction is called the flushing oil and may upon leaving the intermediate space in the double walled tube be accumulated in a reservoir, e.g. by means of an oil pump. The oil may be used again—if necessary after being filtered and cleaned in a suitable way and if necessary clay treated or treated in other ways before it is used again. However, it may alternatively be brought directly back to the impregnating vessel or to some other parts of the system without any extra treatment if special precautions are taken.

When the end of the double walled tube with the holes, which preferably may be transverse slots in the wall, extends sufficiently into the sheath, a pocket will be formed between the double walled tube, the extruding die and the sheath. When the oil comes in touch with the extruding die and the hot sheath, it is subjected to excessive heat so that the oil partly evaporates. The partly closed vapor zone having high thermal resistance, protects on one hand the rest of the oil against excessive heat and protects on the other hand the extruding die against excessive cooling. The oil is forced into the double walled tube, and will, therefore, not come in direct touch with the hot metal surfaces, such as the sheath and extruding die. The sheath will, due to the friction between the sheath and the oil, have a tendency to bring some of the oil vapor into the cable, and this is undesirable even for small amounts. The flushing process will, however, reduce this tendency to a minimum and instead make sure that this part of the oil vapor is brought with the flushing oil into the intermediate space in the double walled tube.

The flushing oil may also be led to a de-gasing device which removes the oil vapor not being condensed into the oil, whereupon the oil is led back to the impregnating vessel or to a vessel for de-gasified oil ready for use for impregnation.

The fact that small amounts of the most volatile oil derivatives thereby disappear, is of no practical significance, for the quality of the oil. Before the oil is led into the de-gasifier, it may be advantageous to let the oil pass through a filter in order to remove possible particles which may have come into the oil (as e.g. paper dust from the cable). As the flushing oil necessarily is heated to a certain extent it should be passed through a cooling device.

Before the oil is drawn from the impregnating vessel into the extruder and the tube which connects the extruder with the impregnating vessel, the system should be evacuated so that the oil does not come in touch with air, whereby the oil would be oxidized.

The above-mentioned and other features and objects of the present invention, will clearly appear from the following detailed description of several embodiments of the invention in conjunction with the drawings, where:

FIGURE 1 shows schematically an extruding system in which the flushing oil is led back to the impregnating vessel;

FIGURE 3 shows another embodiment of the double walled tube.

Figure 2:
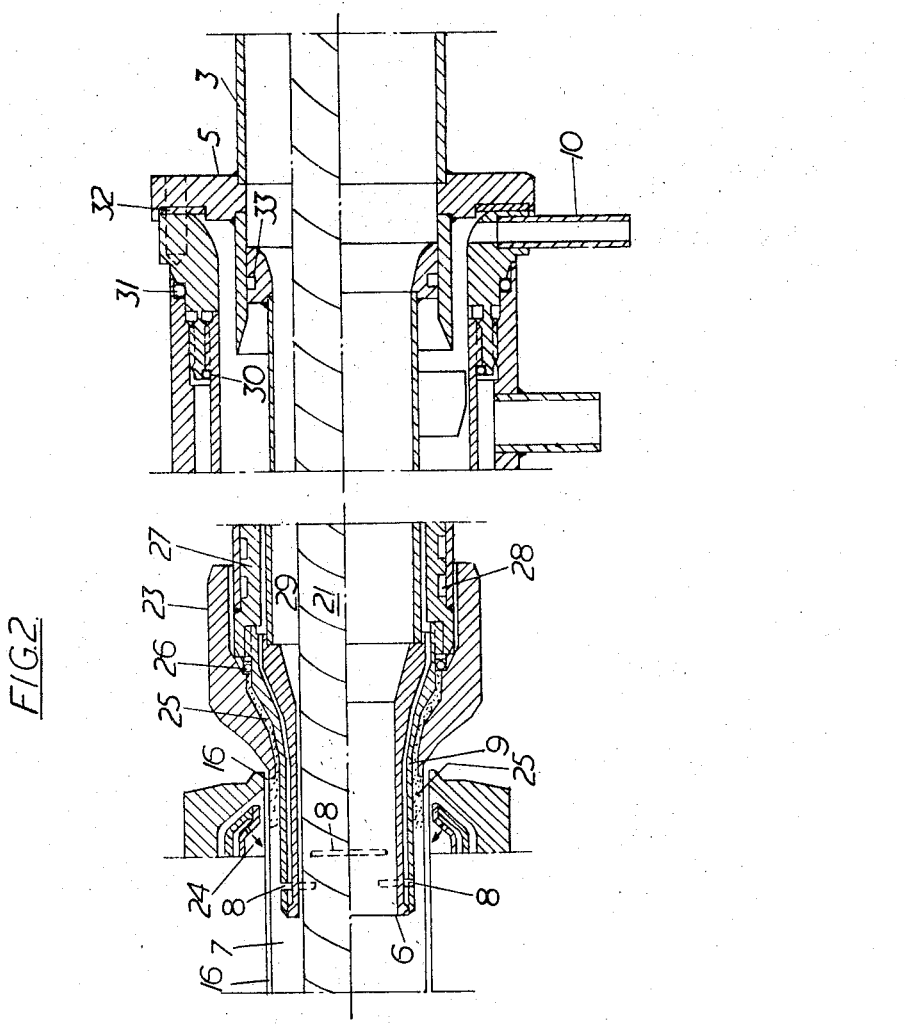
FIGURE 2 shows an embodiment of the double walled tube which may be adapted to fit a Schloemann aluminium press.

An impregnating vessel 1 is connected with an extruder 2, by means of a tube 3 and vacuum tight gaskets 4 and 5. A double walled tube 6, must, due to limited space, have thin walls and should preferably consist of stainless steel or some other mechanical solid material, which does not act as a catalyst for oxidation of the oil or otherwise cause deterioration of the oil. Its inner wall is hydraulically connected to the tube 3, between the vessel 1 and the extruder 2, in such a way that the oil 7, which comes from the vessel 1, passes via the tube 3 to the inside of the tube 6. By means of the holes 8 in the outer wall of the tube 6, the oil 7 may further flow through the intermediate space 9 in the double walled tube 6, this intermediate space being hydraulically connected to an oil conducting tube 10, which may be in direct connection with an accumulating reservoir for the oil, or as shown in FIG. 1, with the impregnating vessel 1. In the latter case it may be advantageous and often necessary to let the oil 7 pass a filter 12, a cooler 13, and a de-gasifier 14 on the way back to the impregnating vessel. As the de-gasifier 14 is vacuum operated, it is necessary to arrange a pump 15 before the vessel 1, as the latter has to be under pressure. This pump 15 is therefore providing the circulation of oil. It may sometimes also be advantageous to arrange a pump 11 before the filter in order to increase the velocity. It may also sometimes be preferable to let the cooler 13 and the de-gasifier 14 with pump 15 change places in the system. The oil may naturally also be led via a filter 12, a cooler 13 and so on to a separate reservoir or to the tube 3 instead of the impregnating vessel 1.

Before the tube 3 and the double walled tube 6 are filled with oil, some of the metal sheath 16 has to be extruded and an end sleeve 17 is applied vacuum tight and possibly also provided with a nipple 18 connected to a vacuum pump 19 which ensures that the system is evacuated so that the oil does not come in touch with air. The system may naturally also be evacuated by other means, as e.g. by introducing a vacuum pump 19' connected to the tube 3 via a valve 20' which are shown with the broken lines in FIG. 1. In order to avoid that oil 7 flows into the tube 3 and double walled tube 6 and metal sheath 16 etc. before the system is evacuated, the outlet of the vessel 1 at flange 4 is provided with a specially designed valve which is not shown in the figure. This valve is closed during the evacuation. When the system is sufficiently evacuated, it is filled with oil from the vessel 1. It may, however, also be filled with de-gasified oil from any other suitable oil reservoir than the impregnating vessel.

When the system is filled with oil and the above described oil-circulation is started, the cable 21 is pulled by means of a metal wire 22 or such, connected to the sleeve 17 on the metal sheath 16, as the extrusion of the sheath is started.

When the oil comes in touch with the extruding die 23 and the hot part of the metal sheath 16' (before this is cooled by means of cooling water as shown at 24), it will evaporate and a pocket of oil vapor 25 is formed between the double walled tube 6, the extruding die 23 and the hot part of the metal sheath 16'. During the evacuation, in order to further avoid oil or oil vapor flow between the tube 6 and the die 23 or air coming into the system, a gasket 26 of suitable heat resistant material is positioned between tube 6 and die 23. It is considered an advantage that the oil circulation, as shown with arrows in FIG. 1, has high speed, partly for avoiding excessive heating of the oil, and partly for reducing oil vapor 25 that is brought with the metal sheath into the cable during the extrusion of the sheath.

The double walled tube with holes for oil circulation must be adapted for the different types of extruders for which it is to be used. In FIG. 2 there is shown in detail a device which e.g. may be used for the so-called Schloemann aluminium press. This extruder is originally provided with a removable cooling shield 27 having a double threaded track 28 for cooling water. In this case the double walled tube 6 is connected to the cooling shield, and to a single walled tube 29 which preferably consists of stainless steel, the intermediate space 9 in the double walled tube 6 communicating with the intermediate space between the tube 29 and the cooling shield 27. The gaskets 30, 31 and 32 are made vacuum tight of suitable heat resistant gasket material. The gasket 33 between the tubes 29 and 3 does not have to be vacuum tight.

In FIG. 3 is shown another embodiment of the double walled tube 6 where the end of this tube is provided with a flange 34, the purpose of which is to reduce the intermediate space 35 between the sheath 16 and the double walled tube 6 at its end, in order to increase the velocity of oil at this place. The oil 7 will thereby more easily bring possible oil vapor 25, which otherwise might follow the sheath 16 due to friction into the holes 8 in the double walled tube 6.

While we have described above the principles of our invention in connection with specific apparatus, it is to be clearly understood that this description is made only by way of example and not as a limitation to the scope of our invention as set forth in the objects and in the accompanying claims.

We claim:

1. A device for manufacturing a pre-impregnated oil-filled cable comprising an inner cable, a metal sheath surrounding said cable and having an inner diameter larger than the outer diameter of the cable core, an extruding die surrounding a portion of said cable and adapted to extrude metal around said cable as the cable is moved along an axial path to form said metal sheath, a heat protecting tube disposed within the extruding die and coaxial therewith between the metal sheath and the cable, a source of oil, said tube having a first channel permitting said oil to flow around said cable within said tube in the direction of the movement of the cable and a second channel permitting the oil to flow in an opposite direction within said tube to provide cooling of the cable core and the extruding die and the hot metal sheath.

2. A device according to claim 1 wherein said tube comprises inner and outer concentric walls with an intermediate space therebetween, holes disposed in said outer wall so that said oil is forced to flow from around said table into said intermediate space in a flow direction opposite to the direction in which the cable is moved, an oil reservoir, and means conducting said oil from said intermediate space into said reservoir 3. A device according to claim 2, wherein said holes in the outer wall of said tube consist of transverse slots.

4. A device according to claim 2, wherein said holes in the outer wall of said tube are arranged near the end of the tube, so that the oil flows through the holes at a position spaced from the extruding die before it enters said intermediate space and flows past said die.

5. A device according to claim 2, wherein the end of said tube includes a flange which reduces the cross section for oil flow between the tube and the sheath in order to increase the oil velocity at said end.

6. A device according to claim 2, wherein the end portion of said tube is double walled while the rest is single walled, the extruding die having a cooling shield between the die and single walled portion and having an end intermediate space between the cooling shield and the single walled tube portion communicating with the intermediate space in the double walled end of the tube on one side and with said reservoir on the other side.

7. A device according to claim 2, further comprising a filter and a cooler disposed between said tube and reservoir for cleaning and cooling said oil.

8. A device according to claim 7, further comprising a de-gasifier coupled between said cooler and said reservoir.

9. A device according to claim 8, including means returning said oil to said tube from said reservoir so that the oil flows in a closed system.

10. A device according to claim 9, wherein said reservoir comprises an impregnating vessel providing said source of oil and containing an unsheathed end of the cable.

References Cited
UNITED STATES PATENTS

| | | | |
|---|---|---|---|
| 3,073,441 | 1/1963 | Priaroggia | 72—268 |
| 3,120,305 | 2/1964 | Linnerz | 72—268 |

CHARLES W. LANHAM, *Primary Examiner.*

H. D. HOINKES, *Assistant Examiner.*